US012809579B2

(12) United States Patent
Lee et al.

(10) Patent No.: US 12,809,579 B2
(45) Date of Patent: Nov. 24, 2026

(54) DISPLAY DEVICE

(71) Applicant: LG ELECTRONICS INC., Seoul (KR)

(72) Inventors: Donghee Lee, Seoul (KR); Changhoe Kim, Seoul (KR); Yongwoo Yoo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 143 days.

(21) Appl. No.: 18/730,725

(22) PCT Filed: Jan. 26, 2022

(86) PCT No.: PCT/KR2022/001347
§ 371 (c)(1),
(2) Date: Jul. 19, 2024

(87) PCT Pub. No.: WO2023/145985
PCT Pub. Date: Aug. 3, 2023

(65) Prior Publication Data
US 2025/0103280 A1 Mar. 27, 2025

(51) Int. Cl.
*G06F 3/16* (2006.01)
*G10L 15/22* (2006.01)
(Continued)

(52) U.S. Cl.
CPC .............. *G06F 3/167* (2013.01); *G10L 15/22* (2013.01); *G10L 17/22* (2013.01); *G10L 21/0216* (2013.01); *G10L 2021/02161* (2013.01)

(58) Field of Classification Search
CPC ........... G10L 2021/02165; G10L 15/20; G10L 2015/088
See application file for complete search history.

(56) References Cited

U.S. PATENT DOCUMENTS 5,583,968 A * 12/1996 Trompf .................. G10L 15/20 706/20
6,459,914 B1 * 10/2002 Gustafsson ......... G10L 21/0232 704/226

(Continued)

FOREIGN PATENT DOCUMENTS

KR 1020140135349 11/2014
KR 1020190103081 9/2019
KR 1020200080635 7/2020
WO 2013125414 8/2013

OTHER PUBLICATIONS

Srinivasan, "Using a Remote Wireless Microphone for Speech Enhancement in Non-Stationary Noise," IEEE 2011. (Year: 2011).*

(Continued)

*Primary Examiner* — Paras D Shah
(74) *Attorney, Agent, or Firm* — LEE, HONG, DEGERMAN, KANG & WAIMEY

(57) ABSTRACT

The present disclosure provides a display device and a method of operating the same that can improve voice recognition performance, includes a speaker, a wireless communication interface for communicating with a peripheral device, a microphone for recording surrounding sounds, and a controller that performs voice recognition from data recorded by the microphone, and the controller can supplement user voice recognition using audio data received from a peripheral device.

19 Claims, 6 Drawing Sheets

(51) Int. Cl.
*G10L 17/22* (2013.01)
*G10L 21/0216* (2013.01)

(56) References Cited

U.S. PATENT DOCUMENTS

| | | | | |
|---|---|---|---|---|
| 9,733,895 | B2 * | 8/2017 | Kim | G06F 3/167 |
| 2014/0222436 | A1 * | 8/2014 | Binder | G10L 17/24<br>704/275 |
| 2014/0343935 | A1 | 11/2014 | Jung et al. | |
| 2017/0154625 | A1 * | 6/2017 | Heo | H04N 21/42203 |
| 2018/0270565 | A1 * | 9/2018 | Ganeshkumar | G10L 25/84 |
| 2018/0286394 | A1 | 10/2018 | Li et al. | |
| 2019/0172461 | A1 * | 6/2019 | Jin | G10L 15/30 |
| 2019/0221210 | A1 | 7/2019 | Song | |
| 2019/0385607 | A1 | 12/2019 | Kim et al. | |
| 2020/0126565 | A1 | 4/2020 | Kim et al. | |
| 2021/0306694 | A1 * | 9/2021 | Yoo | H04N 21/4852 |

OTHER PUBLICATIONS

Darko, et al. "Human Movement Detection Based on Acceleration Measurements and k-NN Classification," Eurocon 2007. (Year: 2007).*

Saeed, et al. "TVBDs Coexistence by Leverage Sensing and Geo-location Database," ICCCE 2012. (Year: 2012).*

Wei, et al. "Acoustic Eavesdropping through Wireless Vibrometry," MobiCom'15, 2015. (Year: 2015).*

Yasuda et al. "Network expansion strategy for elastic optical networks that considers channel capacity upgrades," Proc. of SPIE, 2017. (Year: 2017).*

O'Shaughnessy, "Interacting With Computers by Voice: Automatic Speech Recognition and Synthesis," IEEE 2003. (Year: 2003).*

European Patent Office Application Serial No. 22924243.3, Search Report dated Dec. 3, 2024, 13 pages.

PCT International Application No. PCT/KR2022/001347 International Search Report dated Oct. 12, 2022, 3 pages.

* cited by examiner

DISPLAY DEVICE

CROSS-REFERENCE TO RELATED APPLICATION(S)

This application is the National Stage filing under 35 U.S.C. 371 of International Application No. PCT/KR2022/001347, filed on Jan. 26, 2022, the contents of which are all incorporated by reference herein in its entirety.

TECHNICAL FIELD

This disclosure relates to a display device, and more specifically, to voice recognition in a display device.

BACKGROUND ART

Digital TV services using wired or wireless communication networks are becoming common. The digital TV services may provide various services that cannot be provided by existing analog broadcasting services.

For example, in the case of IPTV (Internet Protocol Television) and smart TV services, which are types of digital TV services, interactivity is provided so that users can actively select the types of programs to watch, the viewing time, and the like. IPTV and smart TV services may provide various additional services, such as Internet search, home shopping, online games, etc., based on such interactivity.

Additionally, recently, with the development of voice recognition technology, display devices provide a function that allows users to control them with voice. Accordingly, it has become possible for users to more easily control the display by simply uttering commands.

However, there is a problem in which the command is not properly recognized due to surrounding noise including the sound of the video being played on the display device, while the display device is receiving a command. In addition, there is a problem that the command recognition rate is lowered due to various factors, such as the user uttering the command being located far away from the display device.

DISCLOSURE

Technical Problem

The present disclosure seeks to provide a display device and a method of operating the same that can improve voice recognition performance.

The present disclosure seeks to provide a display device and a method of operating the same that can improve voice preprocessing performance.

Technical Solution

A display device according to an embodiment of the present disclosure seeks to recognize user voice by considering audio recorded or played back from a peripheral device.

A display device according to an embodiment of the present disclosure includes a speaker, a wireless communication interface that communicates with a peripheral device, a microphone that records surrounding sounds, and a controller that performs user voice recognition from data recorded by the microphone, and the controller can compensate user voice recognition using audio data received from the peripheral device.

Audio data may include at least one of recording data recorded by a peripheral device and sound source data being played on the peripheral device.

If the display device is not linked to a peripheral device, the controller recognizes the user voice from the data recorded by the microphone using first preprocessing data, and if the display device is linked to the peripheral device, the controller obtains second preprocessing data based on audio data received from the peripheral device, and recognizes the user voice from the data recorded by the microphone using the second preprocessing data.

When movement of the peripheral device is detected, the controller can receive audio data again from the peripheral device whose movement was detected and modify the second preprocessing data.

The controller can detect the movement of the peripheral device based on changes in a sensing value of an acceleration sensor provided in the peripheral device.

The controller can detect movement of peripheral devices based on detection of a decrease in preprocessing performance.

If the location of the peripheral device cannot be recognized due to the movement of the peripheral device, the controller can recognize the user voice from the data recorded by the microphone using first preprocessing data.

When a decrease in communication speed is detected, the controller can recognize the user voice from the data recorded by the microphone using first preprocessing data.

The controller may synchronize the position and delay time with the peripheral device based on at least one of sound source data being output through a speaker, data recorded by a microphone, and audio data received from the peripheral device.

If there is no sound source output through the speaker or synchronization is not performed, the controller can synchronize the position and delay time by outputting a sample sound corresponding to the inaudible frequency band.

The controller can calculate the location of the peripheral device by adjusting the beamforming angle of the microphone.

The peripheral device may include at least one of a remote control device, a mobile terminal, and a Bluetooth speaker that transmits a control signal to the display device.

The controller can extract user commands from each of the data recorded by the microphone and the data recorded by the peripheral device, and recognize the largest command among the extracted user commands as the user voice.

The controller can extract user commands from each of the data recorded by the microphone and the data recorded by the peripheral device, and recognize user commands that match at least two of the extracted user commands as user voice.

When the wakeup word is recognized, the controller can compensate user voice recognition using audio data received from the peripheral device.

Advantageous Effects

According to an embodiment of the present disclosure, it is possible to more accurately distinguish user voice from surrounding noise through audio recorded or played back in a peripheral device, which has the advantage of improving voice recognition performance.

According to an embodiment of the present disclosure, there is an advantage in that preprocessing performance for voice recognition is improved by synchronizing the location or delay time of peripheral devices.

BEST MODE

Hereinafter, embodiments of the present disclosure will be described in detail with reference to the drawings. The suffixes "module" and "unit or portion" for components used in the following description are merely provided only for facilitation of preparing this specification, and thus they are not granted a specific meaning or function.

A display device according to an embodiment of the present disclosure is, for example, an intelligent display device in which a computer support function is added to a broadcast reception function, and may have an easy-to-use interface such as a handwritten input device, a touch screen, a spatial remote control, or the like since an Internet function is added while fulfilling the broadcast receiving function. In addition, it is connected to the Internet and a computer with the support of a wired or wireless Internet function, so that functions such as e-mail, web browsing, banking, or games can also be performed. A standardized general-purpose OS may be used for these various functions.

Accordingly, in the display device described in the present disclosure, various user-friendly functions can be performed because various applications can be freely added or deleted, for example, on a general-purpose OS kernel. More specifically, the display device may be, for example, a network TV, HBBTV, smart TV, LED TV, OLED TV, and the like, and may be applied to a smart phone in some cases.

Figure 1:
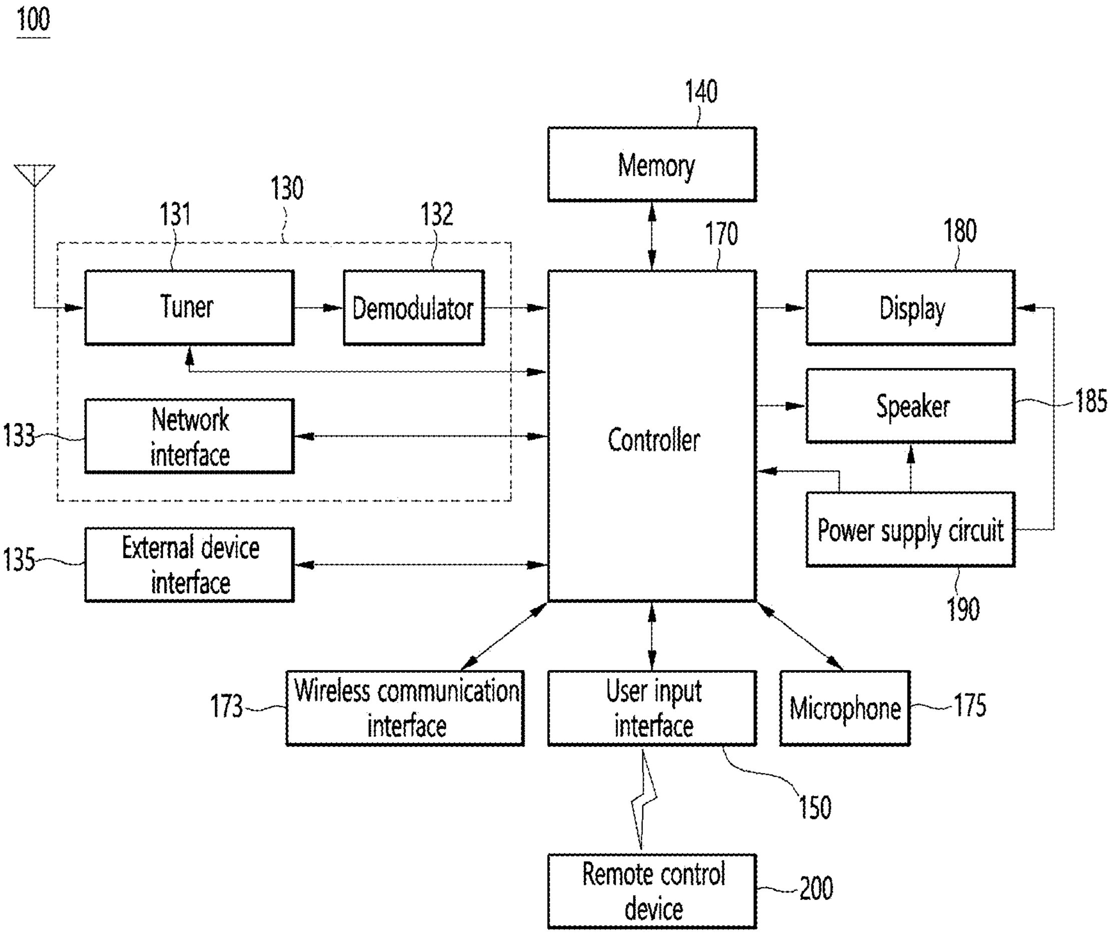
FIG. 1 is a block diagram illustrating a configuration of a display device according to an embodiment of the present disclosure.

FIG. 1 is a block diagram showing a configuration of a display device according to an embodiment of the present disclosure.

Referring to FIG. 1, a display device 100 may include a broadcast receiver 130, an external device interface 135, a memory 140, a user input interface 150, a controller 170, a wireless communication interface 173, a microphone 175, a display 180, a speaker 185, and a power supply circuit 190.

The broadcast receiver 130 may include a tuner 131, a demodulator 132, and a network interface 133.

The tuner 131 may select a specific broadcast channel according to a channel selection command. The tuner 131 may receive a broadcast signal for the selected specific broadcast channel.

The demodulator 132 may separate the received broadcast signal into an image signal, an audio signal, and a data signal related to a broadcast program, and restore the separated image signal, audio signal, and data signal to a format capable of being output.

The external device interface 135 may receive an application or a list of applications in an external device adjacent thereto, and transmit the same to the controller 170 or the memory 140.

The external device interface 135 may provide a connection path between the display device 100 and an external device. The external device interface 135 may receive one or more of images and audio output from an external device connected to the display device 100 in a wired or wireless manner, and transmit the same to the controller 170. The external device interface 135 may include a plurality of external input terminals. The plurality of external input terminals may include an RGB terminal, one or more High Definition Multimedia Interface (HDMI) terminals, and a component terminal.

The image signal of the external device input through the external device interface 135 may be output through the display 180. The audio signal of the external device input through the external device interface 135 may be output through the speaker 185.

The external device connectable to the external device interface 135 may be any one of a set-top box, a Blu-ray player, a DVD player, a game machine, a sound bar, a smartphone, a PC, a USB memory, and a home theater, but this is only an example.

The network interface 133 may provide an interface for connecting the display device 100 to a wired/wireless network including an Internet network. The network interface 133 may transmit or receive data to or from other users or other electronic devices through a connected network or another network linked to the connected network.

In addition, a part of content data stored in the display device 100 may be transmitted to a selected user among a selected user or a selected electronic device among other users or other electronic devices registered in advance in the display device 100.

The network interface 133 may access a predetermined web page through the connected network or the other network linked to the connected network. That is, it is possible to access a predetermined web page through a network, and transmit or receive data to or from a corresponding server.

In addition, the network interface 133 may receive content or data provided by a content provider or a network operator. That is, the network interface 133 may receive content such as movies, advertisements, games, VOD, and broadcast signals and information related thereto provided from a content provider or a network provider through a network.

In addition, the network interface 133 may receive update information and update files of firmware provided by the network operator, and may transmit data to an Internet or content provider or a network operator.

The network interface 133 may select and receive a desired application from among applications that are open to the public through a network.

The memory 140 may store programs for signal processing and control of the controller 170, and may store images, audio, or data signals, which have been subjected to signal-processed.

In addition, the memory 140 may perform a function for temporarily storing images, audio, or data signals input from an external device interface 135 or the network interface 133, and store information on a predetermined image through a channel storage function.

The memory 140 may store an application or a list of applications input from the external device interface 135 or the network interface 133.

The display device 100 may play a content file (a moving image file, a still image file, a music file, a document file, an application file, or the like) stored in the memory 140 and provide the same to the user.

The user input interface 150 may transmit a signal input by the user to the controller 170 or a signal from the controller 170 to the user. For example, the user input interface 150 may receive and process a control signal such as power on/off, channel selection, screen settings, and the like from the remote control device 200 in accordance with various communication methods, such as a Bluetooth communication method, a WB (Ultra Wideband) communication method, a ZigBee communication method, an RF (Radio Frequency) communication method, or an infrared (IR) communication method or may perform processing to transmit the control signal from the controller 170 to the remote control device 200.

In addition, the user input interface 150 may transmit a control signal input from a local key (not shown) such as a power key, a channel key, a volume key, and a setting value to the controller 170.

The image signal image-processed by the controller 170 may be input to the display 180 and displayed as an image corresponding to a corresponding image signal. Also, the image signal image-processed by the controller 170 may be input to an external output device through the external device interface 135.

The audio signal processed by the controller 170 may be output to the speaker 185. Also, the audio signal processed by the controller 170 may be input to the external output device through the external device interface 135.

In addition, the controller 170 may control the overall operation of the display device 100.

In addition, the controller 170 may control the display device 100 by a user command input through the user input interface 150 or an internal program and connect to a network to download an application a list of applications or applications desired by the user to the display device 100.

The controller 170 may allow the channel information or the like selected by the user to be output through the display 180 or the speaker 185 along with the processed image or audio signal.

In addition, the controller 170 may output an image signal or an audio signal through the display 180 or the speaker 185, according to a command for playing an image of an external device through the user input interface 150, the image signal or the audio signal being input from an external device, for example, a camera or a camcorder, through the external device interface 135.

Meanwhile, the controller 170 may allow the display 180 to display an image, for example, allow a broadcast image which is input through the tuner 131 or an external input image which is input through the external device interface 135, an image which is input through the network interface or an image which is stored in the memory 140 to be displayed on the display 180. In this case, an image being displayed on the display 180 may be a still image or a moving image, and may be a 2D image or a 3D image.

In addition, the controller 170 may allow content stored in the display device 100, received broadcast content, or external input content input from the outside to be played, and the content may have various forms such as a broadcast image, an external input image, an audio file, still images, accessed web screens, and document files.

The wireless communication interface 173 may communicate with an external device through wired or wireless communication. The wireless communication interface 173 may perform short range communication with an external device. To this end, the wireless communication interface 173 may support short range communication using at least one of Bluetooth™, Radio Frequency Identification (RFID), Infrared Data Association (IrDA), Ultra Wideband (UWB), ZigBee, Near Field Communication (NFC), Wi-Fi (Wireless-Fidelity), Wi-Fi (Wireless-Fidelity), Wi-Fi Direct, and Wireless USB (Wireless Universal Serial Bus) technologies. The wireless communication interface 173 may support wireless communication between the display device 100 and a wireless communication system, between the display device 100 and another display device 100, or between the display device 100 and a network in which the display device 100 (or an external server) is located through wireless area networks. The wireless area networks may be wireless personal area networks.

Here, another display device 100 may be a wearable device (e.g., a smartwatch, smart glasses or a head mounted display (HMD), a mobile terminal such as a smart phone, which is able to exchange data (or interwork) with the display device 100 according to the present disclosure. The wireless communication interface 173 may detect (or recognize) a wearable device capable of communication around the display device 100.

Furthermore, when the detected wearable device is an authenticated device to communicate with the display device 100 according to the present disclosure, the controller 170 may transmit at least a portion of data processed by the display device 100 to the wearable device through the wireless communication interface 173. Therefore, a user of the wearable device may use data processed by the display device 100 through the wearable device.

The microphone 175 can acquire audio. The microphone 175 may include at least one microphone (not shown), and may acquire audio around the display device 100 through the microphone (not shown).

The display 180 may convert image signals, data signals, and OSD signals processed by the controller 170, or image signals or data signals received from the external device interface 135 into R, G, and B signals, and generate drive signals.

Meanwhile, since the display device 100 shown in FIG. 1 is only an embodiment of the present disclosure, some of the illustrated components may be integrated, added, or omitted depending on the specification of the display device 100 that is actually implemented.

That is, two or more components may be combined into one component, or one component may be divided into two or more components as necessary. In addition, a function performed in each block is for describing an embodiment of the present disclosure, and its specific operation or device does not limit the scope of the present disclosure.

According to another embodiment of the present disclosure, unlike the display device 100 shown in FIG. 1, the display device 100 may receive an image through the network interface 133 or the external device interface 135 without a tuner 131 and a demodulator 132 and play the same.

For example, the display device 100 may be divided into an image processing device, such as a set-top box, for receiving broadcast signals or content according to various network services, and a content playback device that plays content input from the image processing device.

In this case, an operation method of the display device according to an embodiment of the present disclosure will be described below may be implemented by not only the display device 100 as described with reference to FIG. 1 and but also one of an image processing device such as the separated set-top box and a content playback device including the display 180 and the speaker 185.

Next, a remote control device according to an embodiment of the present disclosure will be described with reference to FIGS. 2 to 3.

Figure 2:
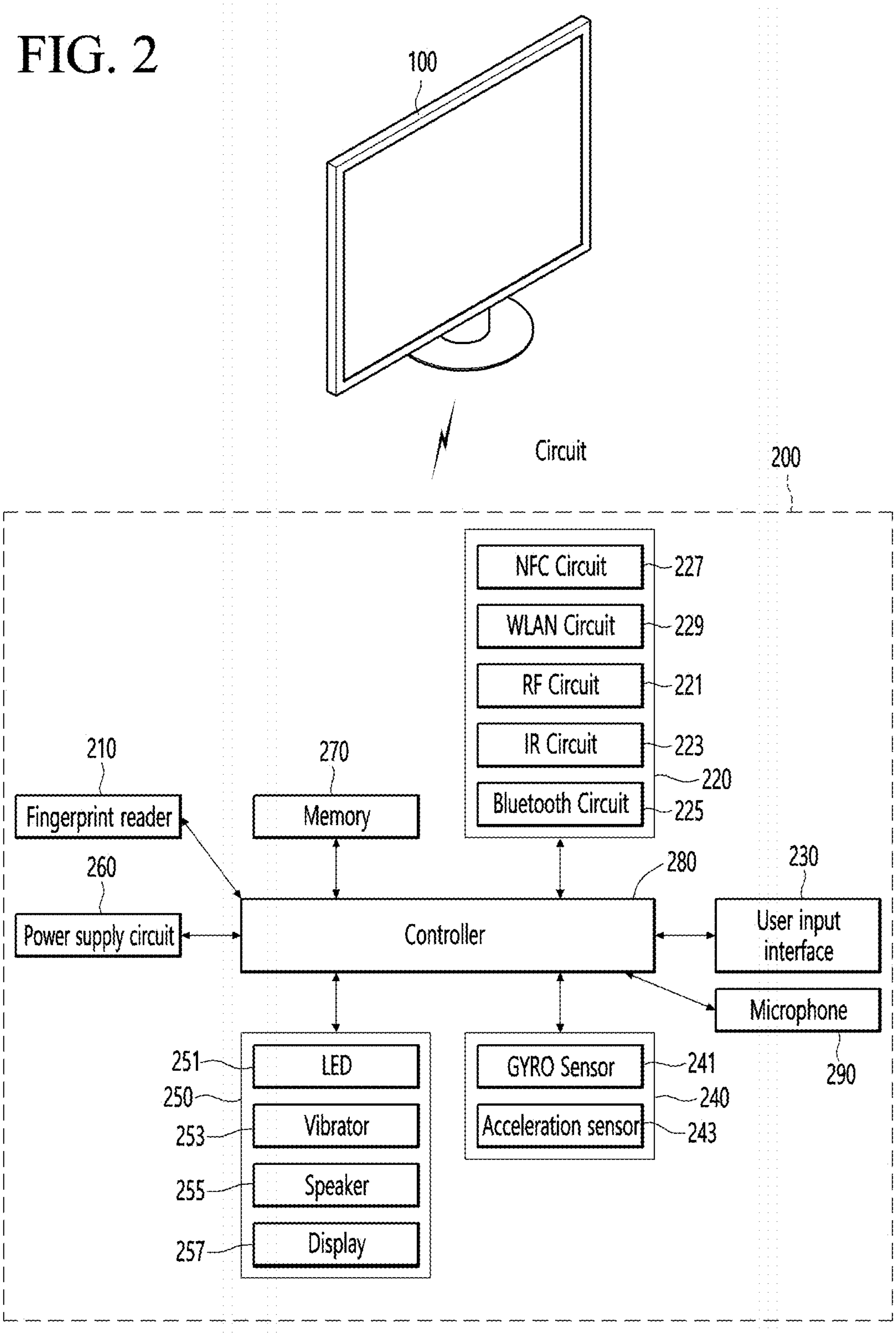
FIG. 2 is a block diagram of a remote control device according to an embodiment of the present disclosure.
Figure 3:
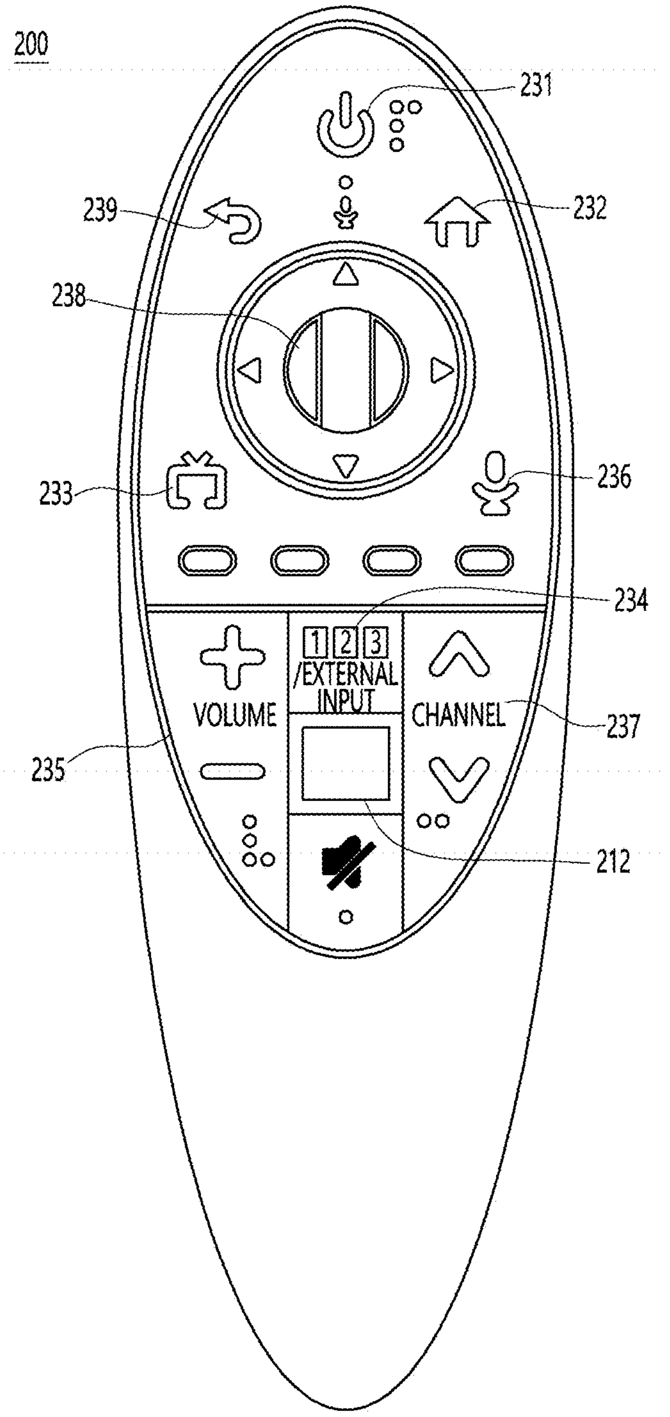
FIG. 3 shows an example of an actual configuration of a remote control device according to an embodiment of the present disclosure.

FIG. 2 is a block diagram of a remote control device according to an embodiment of the present disclosure, and FIG. 3 shows an actual configuration example of a remote control device 200 according to an embodiment of the present disclosure.

First, referring to FIG. 2, the remote control device 200 may include a fingerprint reader 210, a wireless communication circuit 220, a user input interface 230, a sensor 240, an output interface 250, a power supply circuit 260, a memory 270, a controller 280, and a microphone 290.

Referring to FIG. 2, the wireless communication circuit 220 may transmit and receive signals to and from any one of display devices according to embodiments of the present disclosure described above.

The remote control device 200 may include an RF circuit 221 capable of transmitting and receiving signals to and from the display device 100 according to the RF communication standard, and an IR circuit 223 capable of transmitting and receiving signals to and from the display device 100 according to the IR communication standard. In addition, the remote control device 200 may include a Bluetooth circuit 225 capable of transmitting and receiving signals to and from the display device 100 according to the Bluetooth communication standard. In addition, the remote control device 200 may include an NFC circuit 227 capable of transmitting and receiving signals to and from the display device 100 according to the NFC (near field communication) communication standard, and a WLAN circuit 229 capable of transmitting and receiving signals to and from the display device 100 according to the wireless LAN (WLAN) communication standard.

In addition, the remote control device 200 may transmit a signal containing information on the movement of the remote control device 200 to the display device 100 through the wireless communication circuit 220.

In addition, the remote control device 200 may receive a signal transmitted by the display device 100 through the RF circuit 221, and transmit a command regarding power on/off, channel change, volume adjustment, or the like to the display device 100 through the IR circuit 223 as necessary.

The user input interface 230 may include a keypad, a button, a touch pad, a touch screen, or the like. The user may input a command related to the display device 100 to the remote control device 200 by operating the user input interface 230. When the user input interface 230 includes a hard key button, the user may input a command related to the display device 100 to the remote control device 200 through a push operation of the hard key button. Details will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, an OK button 238, and a back-play button 239.

The fingerprint recognition button 212 may be a button for recognizing a user's fingerprint. In one embodiment, the fingerprint recognition button 212 may enable a push operation, and thus may receive a push operation and a fingerprint recognition operation.

The power button 231 may be a button for turning on/off the power of the display device 100.

The home button 232 may be a button for moving to the home screen of the display device 100.

The live button 233 may be a button for displaying a real-time broadcast program.

The external input button 234 may be a button for receiving an external input connected to the display device 100.

The volume control button 235 may be a button for adjusting the level of the volume output by the display device 100.

The voice recognition button 236 may be a button for receiving a user's voice and recognizing the received voice.

The channel change button 237 may be a button for receiving a broadcast signal of a specific broadcast channel.

The OK button 238 may be a button for selecting a specific function, and the back-play button 239 may be a button for returning to a previous screen.

A description will be given referring again to FIG. 2.

When the user input interface 230 includes a touch screen, the user may input a command related to the display device 100 to the remote control device 200 by touching a soft key of the touch screen. In addition, the user input interface 230 may include various types of input means that may be operated by a user, such as a scroll key or a jog key, and the present embodiment does not limit the scope of the present disclosure.

The sensor 240 may include a gyro sensor 241 or an acceleration sensor 243, and the gyro sensor 241 may sense information regarding the movement of the remote control device 200.

For example, the gyro sensor 241 may sense information about the operation of the remote control device 200 based on the x, y, and z axes, and the acceleration sensor 243 may sense information about the moving speed of the remote control device 200. Meanwhile, the remote control device 200 may further include a distance measuring sensor to sense the distance between the display device 100 and the display 180.

The output interface 250 may output an image or audio signal corresponding to the operation of the user input interface 230 or a signal transmitted from the display device 100.

The user may recognize whether the user input interface 230 is operated or whether the display device 100 is controlled through the output interface 250.

For example, the output interface 450 may include an LED 251 that emits light, a vibrator 253 that generates vibration, a speaker 255 that outputs sound, or a display 257 that outputs an image when the user input interface 230 is operated or a signal is transmitted and received to and from the display device 100 through the wireless communication interface 225.

In addition, the power supply circuit 260 may supply power to the remote control device 200, and stop power supply when the remote control device 200 has not moved for a predetermined time to reduce power consumption.

The power supply circuit 260 may restart power supply when a predetermined key provided in the remote control device 200 is operated.

The memory 270 may store various types of programs and application data required for control or operation of the remote control device 200.

When the remote control device 200 transmits and receives signals wirelessly through the display device 100 and the RF circuit 221, the remote control device 200 and the display device 100 transmit and receive signals through a predetermined frequency band.

The controller 280 of the remote control device 200 may store and refer to information on a frequency band capable of wirelessly transmitting and receiving signals to and from the display device 100 paired with the remote control device 200 in the memory 270.

The controller 280 may control all matters related to the control of the remote control device 200. The controller 280 may transmit a signal corresponding to a predetermined key operation of the user input interface 235 or a signal corresponding to the movement of the remote control device 200 sensed by the sensor 240 through the wireless communication interface 225.

Also, the microphone 290 of the remote control device 200 may obtain a speech.

A plurality of microphones 290 may be provided.

Next, a description will be given referring to FIG. 4.

Figure 4:
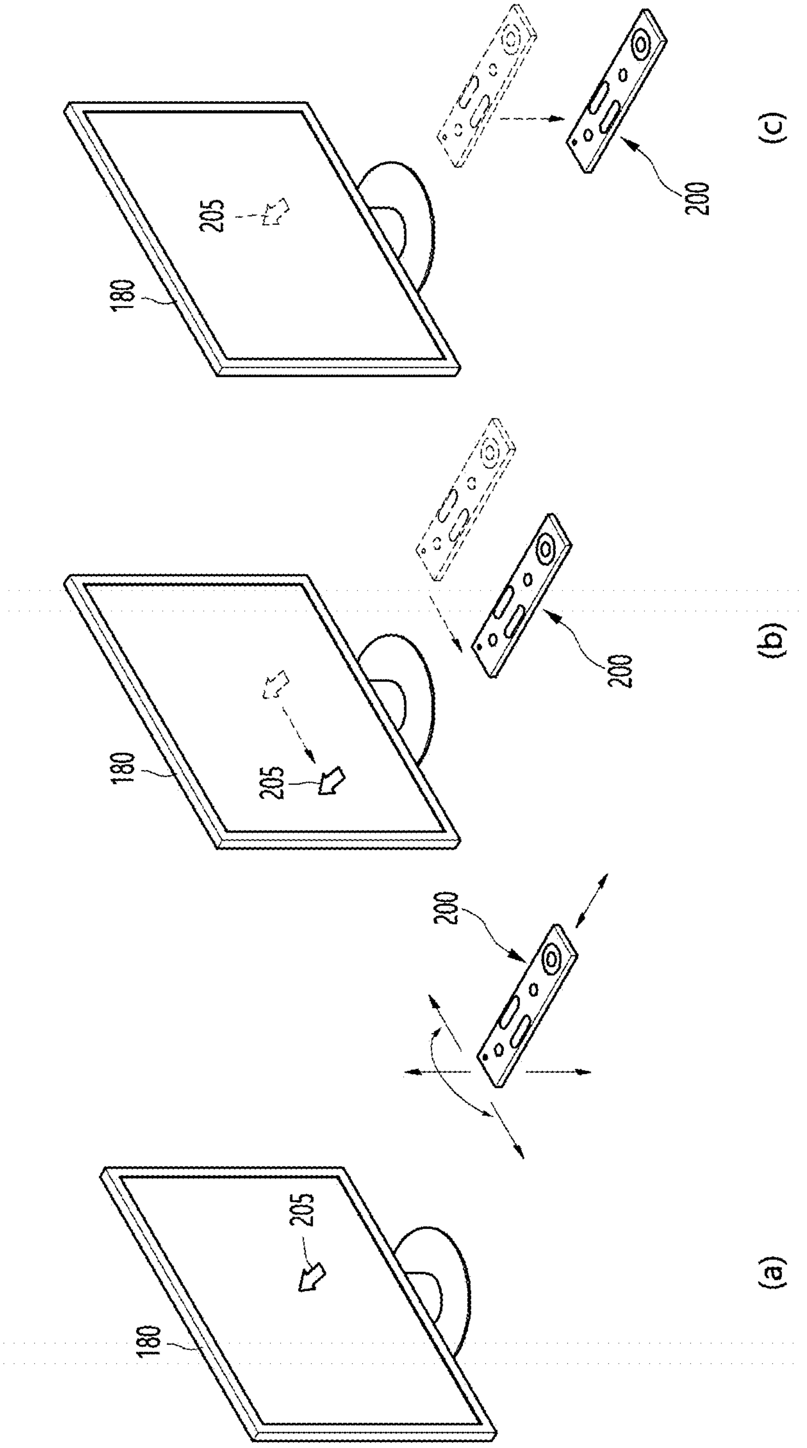
FIG. 4 shows an example of using a remote control device according to an embodiment of the present disclosure.

FIG. 4 shows an example of using a remote control device according to an embodiment of the present disclosure.

In FIG. 4, (a) illustrates that a pointer 205 corresponding to the remote control device 200 is displayed on the display 180.

The user may move or rotate the remote control device 200 up, down, left and right. The pointer 205 displayed on the display 180 of the display device 100 may correspond to the movement of the remote control device 200. As shown in the drawings, the pointer 205 is moved and displayed according to movement of the remote control device 200 in a 3D space, so the remote control device 200 may be called a space remote control device.

In (b) of FIG. 4, it is illustrated that that when the user moves the remote control device 200 to the left, the pointer 205 displayed on the display 180 of the display device 100 moves to the left correspondingly.

Information on the movement of the remote control device 200 detected through a sensor of the remote control device 200 is transmitted to the display device 100. The display device 100 may calculate the coordinates of the pointer 205 based on information on the movement of the remote control device 200. The display device 100 may display the pointer 205 to correspond to the calculated coordinates.

In (c) of FIG. 4, it is illustrated that a user moves the remote control device 200 away from the display 180 while pressing a specific button in the remote control device 200. Accordingly, a selected area in the display 180 corresponding to the pointer 205 may be zoomed in and displayed enlarged.

Conversely, when the user moves the remote control device 200 to be close to the display 180, the selected area in the display 180 corresponding to the pointer 205 may be zoomed out and displayed reduced.

On the other hand, when the remote control device 200 moves away from the display 180, the selected area may be zoomed out, and when the remote control device 200 moves to be close to the display 180, the selected area may be zoomed in.

Also, in a state in which a specific button in the remote control device 200 is being pressed, recognition of up, down, left, or right movements may be excluded. That is, when the remote control device 200 moves away from or close to the display 180, the up, down, left, or right movements are not recognized, and only the forward and backward movements may be recognized. In a state in which a specific button in the remote control device 200 is not being pressed, only the pointer 205 moves according to the up, down, left, or right movements of the remote control device 200.

Meanwhile, the movement speed or the movement direction of the pointer 205 may correspond to the movement speed or the movement direction of the remote control device 200.

Meanwhile, in the present specification, a pointer refers to an object displayed on the display 180 in response to an operation of the remote control device 200. Accordingly, objects of various shapes other than the arrow shape shown in the drawings are possible as the pointer 205. For example, the object may be a concept including a dot, a cursor, a prompt, a thick outline, and the like. In addition, the pointer 205 may be displayed corresponding to any one point among points on a horizontal axis and a vertical axis on the display 180, and may also be displayed corresponding to a plurality of points such as a line and a surface.

Figure 5:
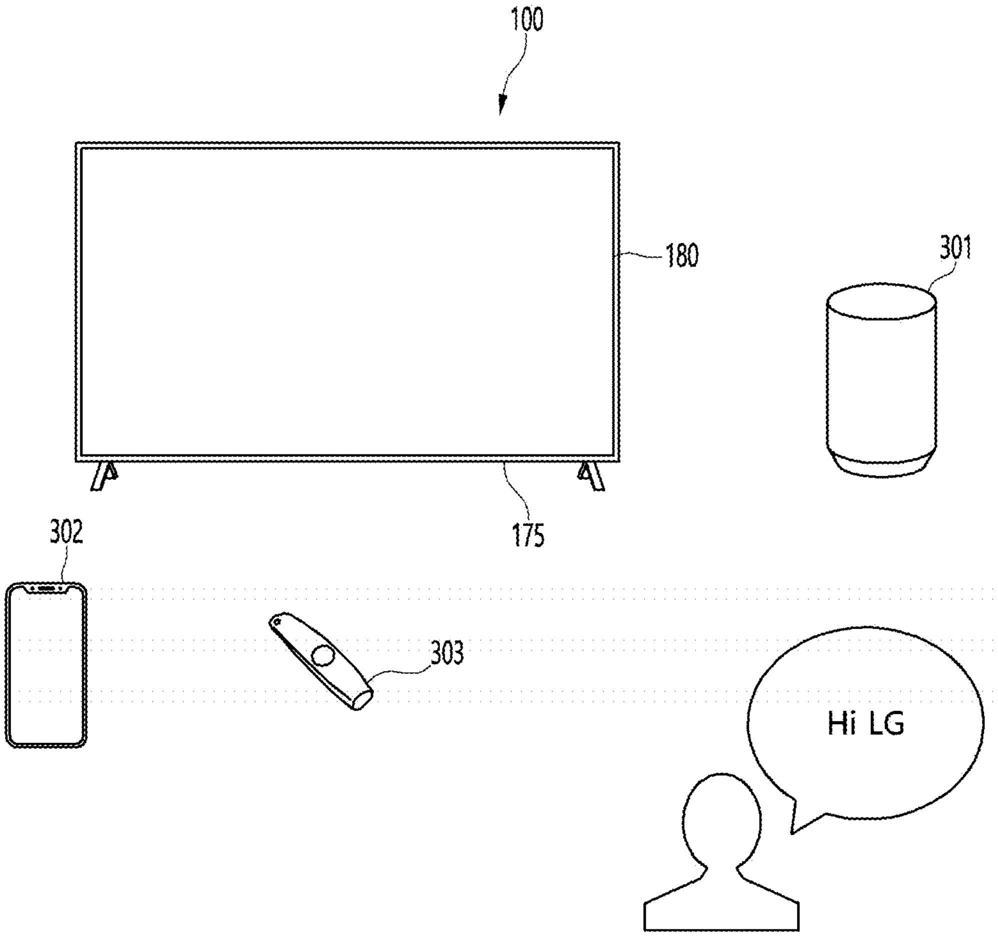
FIG. 5 is a diagram showing a display device and a peripheral device according to an embodiment of the present disclosure.

FIG. 5 is a diagram showing a display device and a peripheral device according to an embodiment of the present disclosure.

At least one peripheral devices 301, 302, 303 may be located around the display device 100. The peripheral devices 301, 302, 303 may include at least one microphone and at least one wireless communication module. The peripheral devices 301, 302, 303 includes a Bluetooth speaker 301, a mobile terminal 302 such as a smartphone, etc., and a remote control device 303 that transmits a control signal to the display device 100. In addition, the peripheral device include various types of electronic devices capable of transmitting and receiving audio data with the display device 100 and equipped with a microphone.

The microphone 175 may be provided in a part of the display device 100. In particular, the microphone 175 may be formed on the exterior of the display device 100. For example, the microphone 175 may be provided at the bottom of the case surrounding the display 180, but since this is only an example, it is reasonable that the location of the microphone 175 is not limited.

The microphone 175 records surrounding sounds, and the controller 170 can acquire recording data recorded by the microphone 175 and perform user voice recognition from the recording data. That is, the controller 170 can recognize the user voice from the recording data of the microphone 175.

According to an embodiment of the present disclosure, the controller 170 can compensate user voice recognition by using audio data received from the peripheral devices 301, 302, 303 in order to more accurately recognize the user voice. there is.

The controller 170 may perform user voice recognition to obtain a wakeup word and user voice recognition to obtain a command. The wakeup word may be a command that starts voice recognition.

According to one embodiment, the controller 170 can always perform compensation of the user voice recognition when recognizing a user voice.

According to another embodiment, the controller 170 may perform compensation of the user voice recognition when recognizing a user voice after the wakeup word is recognized. Specifically, the controller 170 does not perform compensation of the user voice recognition in the operating state for recognizing the wakeup word, but may perform compensation of the user voice recognition when recognizing the user voice to obtain a user command after recognizing the wakeup word. there is. That is, when the wakeup word is recognized, the controller 170 can compensate user voice recognition using audio data received from the peripheral device.

For example, when a wakeup word such as "Hi, LG" is recognized, the controller 170 performs verification of the wakeup word, and when verification of the wakeup word is completed, performs compensation of the user voice recognition to improve recognition of the command.

Figure 6:
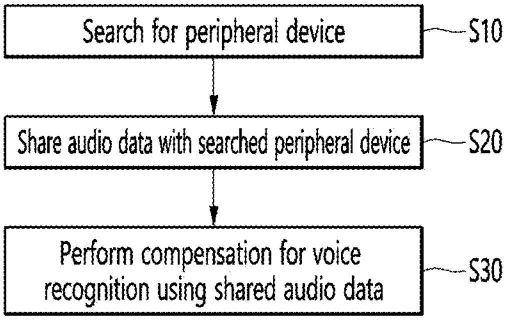
FIG. 6 is a flowchart showing an operating method of a display device according to an embodiment of the present disclosure.

FIG. 6 is a flowchart showing an operating method of a display device according to an embodiment of the present disclosure.

The controller 170 can search for peripheral device (S10).

The controller 170 can search for peripheral devices such as Bluetooth-enabled devices, Wi-Fi connected devices, or devices registered to the display device 100.

The controller 170 may transmit a signal requesting to control the microphone to be turned on to the searched peripheral device. The peripheral device can control the microphone to turn on according to the signal received from the display device 100.

The controller 170 can share audio data with the searched peripheral device (S20).

Audio data may include at least one of recording data recorded through a microphone and sound source data being played through a speaker in each of the display device 100 and the peripheral device.

The controller 170 may receive at least one of recording data recorded by the peripheral device and sound source data being played by the peripheral device through the wireless communication interface 173. Additionally, the controller 170 may transmit recording data recorded by the microphone 175 and sound source data being output through the speaker 185 to at least one peripheral device through the wireless communication interface 173.

In this way, the controller 170 can share audio data by transmitting and receiving audio data with a peripheral device.

The controller 170 may perform compensation for voice recognition using audio data (S30).

Next, a method in which a display device according to various embodiments of the present disclosure performs compensation for voice recognition will be described.

Figure 7:
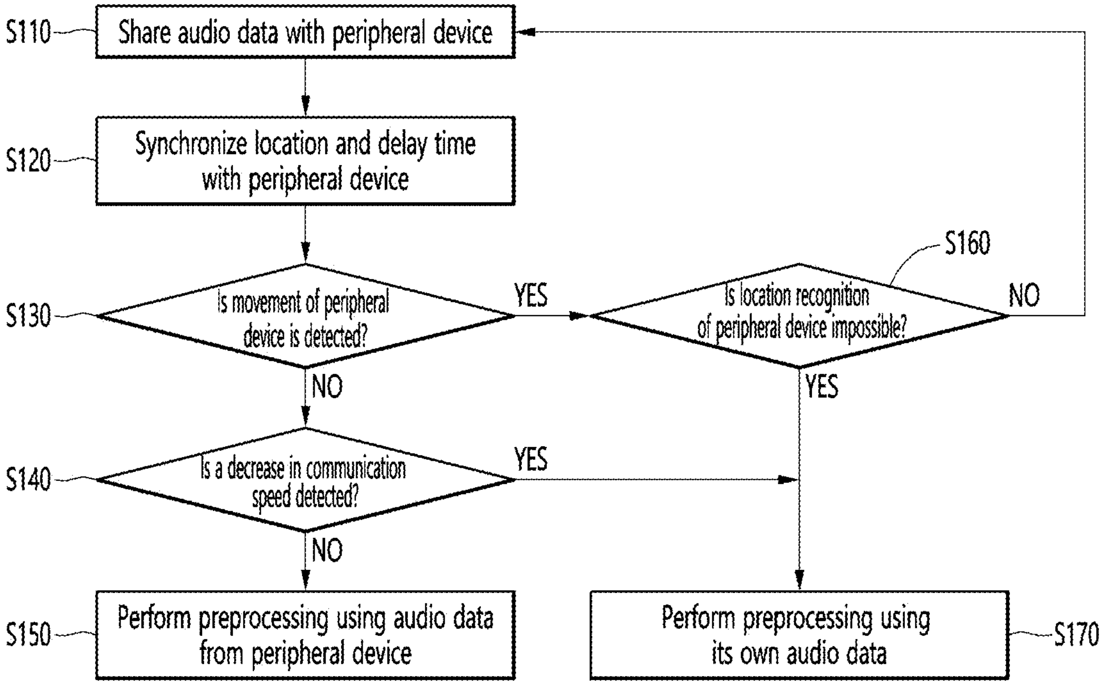
FIG. 7 is a flow chart illustrating a method by which a display device performs voice recognition compensation according to the first embodiment of the present disclosure.

FIG. 7 is a flowchart showing a method by which a display device performs compensation for voice recognition according to the first embodiment of the present disclosure.

According to the first embodiment, the display device 100 can optimize voice preprocessing by linking with peripheral devices equipped with microphones through a network and sharing currently recorded data and played data with each other.

In FIG. 7, it is assumed that the display device 100 is the master and the peripheral device is the slave. However, this is only for convenience of explanation, so it is reasonable that it is not limited thereto.

The controller 170 can share audio data with a peripheral device (S110).

In other words, the display device 100 and the peripheral device can share data of the sound source currently being played and recording data recorded from the microphone.

The controller 170 can synchronize the location and delay time with the peripheral device (S120).

The controller 170 can synchronize the location and delay time with the peripheral device based on at least one of sound source data being output by the speaker 185, recording data recorded by the microphone 175, and audio data received from the peripheral device.

For example, the controller 170 can calculate the location of the peripheral device by adjusting the beamforming angle of the microphone 175. More specifically, the controller 170 can recognize the location of the peripheral device by performing recordings while periodically adjusting the beamforming angle of the microphone 175, and analyzing the size of the sound being output by the peripheral device accordingly.

In addition, the controller 170 can calculate the delay time with the peripheral device by analyzing the time when the sound source is output through the speaker 185 and the time when the sound output from the speaker 185 is recorded by the peripheral device.

In other words, the display device 100 and the peripheral device can synchronize the location and delay time by mutually recording and sharing the currently played sound source.

Meanwhile, when there is no sound source being output through the speaker 185 or synchronization is not performed, the controller 170 can perform synchronization of location and delay time by outputting a sample sound corresponding to an inaudible frequency band.

According to one embodiment, the controller 170 can play by periodically adjusting the left and right volumes of the sound source during synchronization. For example, the controller 170 plays sound source while adjusting the left and right volume sizes to 100 left/0 right, 75 left/25 right, 50 left/50 right, 25 left/75 right, and 0 left/right 100 at predetermined cycles. And the peripheral device can record the sound source whose volume is adjusted and transmit it to the display device 100. The controller 170 can obtain the location and delay time of each peripheral device by analyzing data recorded from the peripheral device. If the controller 170 outputs a sample sound corresponding to an inaudible frequency band, the controller 170 may analyze the sound source by extracting only the sound source in the frequency band for analysis from the data recorded in the peripheral device.

Meanwhile, the delay time here refers to the delay time between actual sound and data according to network transmission, and synchronization may be required. For example, the controller 100 transmits sound source data to play the same sound source as the display device 100 in the peripheral device, and performs synchronization of delay time by analyzing the data recorded by the display device 100.

In this way, when the location and delay time are synchronized between the display device 100 and the peripheral device, preprocessing optimization considering the peripheral device can be performed. That is, the controller 100 can obtain preprocessing data considering sound source data played on the peripheral device. The controller 100 can recognize user voice using the obtained preprocessed data.

The controller 100 and the peripheral device can each utilize the currently playing sound source data for preprocessing by transmitting and interoperating with each other.

Meanwhile, the preprocessed data may change to become unsuitable for user voice recognition due to various factors such as movement of peripheral devices or slow communication speed. In this case, the controller 170 may perform an operation to modify or re-acquire the preprocessing data, which will be described below.

The controller 170 can detect whether the peripheral device is moving (S130).

This is because modification of preprocessing data is required if the location of the peripheral device moves.

For example, the peripheral device may be equipped with an acceleration sensor, and the sensing value of the acceleration sensor may be transmitted to the display device 100. In this case, the controller 170 may detect movement of the peripheral device based on a change in the sensing value of an acceleration sensor provided in the peripheral device.

As another example, the controller 170 may detect movement of a peripheral device based on detection of a decrease in preprocessing performance. Specifically, the controller 170 may calculate preprocessing performance at every predetermined cycle and determine whether the calculated preprocessing performance is less than a preset reference value. If the calculated preprocessing performance is less than the preset reference value, the controller 170 may recognize the preprocessing performance as being deteriorated.

If the movement of the peripheral device is not detected, the controller 170 can detect whether the communication speed has decreased (S140).

This is to prevent deterioration of preprocessing performance by immediately switching to the existing preprocessing mode, since if a network speed delay occurs, mutual data may not be transmitted normally.

Meanwhile, the order of the step of detecting whether the peripheral device is moving and the step of detecting a decrease in communication speed may be changed or performed simultaneously.

If no movement of the peripheral device is detected and no decrease in communication speed is detected, the controller 170 may perform preprocessing using audio data from the peripheral device (S150).

In other words, if no movement of the peripheral device is detected and no decrease in communication speed is detected, the controller 170 may perform user voice recognition using preprocessing data obtained through synchronization with the peripheral device.

Meanwhile, when movement of the peripheral device is detected, the controller 170 can recalculate the location of the moved peripheral device, and at this time, the controller 170 can determine whether recognition of the location of the peripheral device is impossible. (S160).

If the controller 170 is capable of recognizing the location of the peripheral device, it can re-share audio data with the peripheral device to synchronize the location and delay time with the peripheral device whose location has changed.

However, if the controller 170 cannot recognize the location of the peripheral device, it can perform preprocessing using its own audio data (S170). Additionally, even when a decrease in communication speed is detected, the controller 170 can perform preprocessing using each audio data (S170).

In other words, if the location of the peripheral device cannot be recognized or the communication speed is slow, the controller 170 may perform preprocessing using only the audio data of the display device 100 without using the audio data of the peripheral device.

This is because the peripheral device, whose location cannot be recognized by the controller 170, is considered to be in a state where there is no interference between microphones because it is located in another space, etc. In addition, in the case of a decrease in communication speed, this is to prevent a decrease in preprocessing performance due to poor transfer of audio data between each other.

In summary, when the controller 170 is not linked to a peripheral device due to the inability of location recognition or normal communication, the controller 170 recognizes the user voice in the data recorded by the microphone 175 using first preprocessing data. And, when linking with a peripheral device through location recognition or normal communication, the controller 170 acquires second preprocessing data based on audio data received from the peripheral device, and recognizes user voice from the data recorded by the microphone 175 by using the second preprocessing data.

Here, first preprocessing data may mean data for recognizing a user voice in the recording data of the microphone 175, considering only the audio data of the display device 100. The second preprocessing data may refer to data for recognizing a user voice from the recording data of the microphone 175 when considering the audio data of the display device 100 and the audio data of at least one peripheral device.

Therefore, when the location of the peripheral device cannot be recognized due to movement of the peripheral device or a decrease in communication speed is detected, the controller 170 recognizes the user voice from the data recorded by the microphone 175 using first preprocessing data. And, when movement of the peripheral device is detected, the controller 170 may receive audio data again from the peripheral device whose movement was detected and modify the second preprocessing data.

As such, according to the first embodiment of the present disclosure, the display device 100 and the peripheral device synchronize their locations and delay times, so that each device can filter the sound output from the other device. Accordingly, the user voice can be more accurately recognized from the data recorded from each microphone. For example, the controller 170 can more accurately recognize the sound output from the peripheral device in the recording data, and thus can accurately recognize the user voice by filtering the sound output from the peripheral device in the recording data.

Additionally, when multiple devices with voice recognition functions are in the same space, the problem of voice misrecognition due to audio being played back to each other can be minimized. In addition, there is an advantage in that preprocessing performance is improved because voices acquired from multiple devices are preprocessed compared to the existing method of preprocessing voices acquired from a single device. In addition, there is an advantage in that the probability of misrecognition and malfunction can be minimized even when there is a lot of noise, such as when other audio is played near a device with a voice recognition function.

Next, a method by which the display device 100 performs compensation of voice recognition according to the second embodiment of the present disclosure will be described.

According to the second embodiment of the present disclosure, the controller 170 may recognize the user voice based on the size of the command recognized in the data recorded from each of the display device 100 and at least one peripheral device.

Specifically, the controller 170 extracts user commands from each of the data recorded by the microphone 175 and the data recorded from the peripheral device, and recognizes the command with the largest size among the extracted user commands as the user voice.

This reflects the fact that the closer the device is to the user, the more likely it is that the user's speech will be recorded most clearly.

Next, a method by which the display device 100 performs compensation of voice recognition according to the third embodiment of the present disclosure will be described.

According to the third embodiment of the present disclosure, the controller 170 extracts user commands from each of the data recorded by the microphone 175 and the data recorded by the peripheral device, and recognizes user commands that match at least two of the extracted user commands as the user's voice.

Alternatively, the controller 170 may extract user commands from each of the data recorded by the microphone 175 and the data recorded by the peripheral device, and recognize the most frequently extracted user command as the user voice.

According to an embodiment of the present disclosure, even if the user is far away from the display device 100 and the microphone 175 records ambient noise louder than the user voice, the recognition content from the device located around the user is supplemented and therefore user voice can be recognized more accurately.

Additionally, as in the embodiment of the present disclosure, beamforming performance can be improved by considering audio data from a peripheral device rather than the display device 100 alone. For example, assuming that one device is equipped with two microphones, if the two devices operate simultaneously, sound sources from various angles can be recorded through four microphones, thereby improving beamforming performance. In other words, since the master device can use not only its own microphone but also the microphone of at least one slave device, an effect of increasing the number of microphones for long-distance voice recognition can be expected. In addition, there is an advantage in that pre-processing performance is improved by linking external sounds that affect voice pre-processing.

Meanwhile, in this specification, it is explained that the display device 100 is the main device that recognizes user voice, and the peripheral device operates to complement user voice recognition in the display device 100, but the opposite may also be true. That is, one peripheral device is the main device that recognizes the user voice, and the remaining peripheral devices, including the display device 100, may operate to supplement user voice recognition.

According to an embodiment of the present disclosure, the above-described method may be implemented with codes readable by a processor on a medium in which a program is recorded. Examples of the medium readable by the processor include a ROM (Read Only Memory), a Random Access Memory (RAM), a CD-ROM, a magnetic tape, a floppy disk, an optical data storage device, and the like.

The display device as described above is not limited to the configuration and method of the above-described embodiments, but the embodiments may be configured by selectively combining all or part of each embodiment such that various modifications can be made.

The invention claimed is:

1. A display device, comprising:

a speaker;

a wireless communication interface configured to communicate with a peripheral device, wherein the peripheral device comprises a microphone;

a microphone configured to record surrounding sounds; and a controller configured to perform user voice recognition on data recorded by the microphone, if the display device is linked with the peripheral device, obtain preprocessing data based on audio data received from the microphone of the peripheral device, detect movement of the peripheral device;

receive audio data again from the microphone of the peripheral device based on the detected movement of the peripheral device;

modify the preprocessing data based on receiving the audio data again from the peripheral device; and perform voice recognition based on the modified preprocessing data.

2. The display device according to claim 1, wherein the audio data includes at least one of recording data recorded by the peripheral device and sound source data being played by the peripheral device.

3. The display device according to claim 1, wherein the controller is configured to detect the movement of the peripheral device based on change in a sensing value of an acceleration sensor provided in the peripheral device.

4. The display device according to claim 1, wherein the controller is configured to detect the movement of the peripheral device based on detection of a decrease in preprocessing performance.

5. The display device according to claim 1, wherein the controller is configured to recognize the user voice from the data recorded by the microphone using the another preprocessing data, if location of the peripheral device cannot be recognized due to the movement of the peripheral device.

6. The display device according to claim 1, wherein the controller is configured to recognize the user voice from the data recorded by the microphone using the another preprocessing data, if decrease in communication speed is detected.

7. The display device according to claim 1, wherein the peripheral device comprises at least one of a remote control device, a mobile terminal, or a Bluetooth speaker that transmits a control signal to the display device.

8. The display device according to claim 1, wherein the controller is configured to extract user commands from each of the data recorded by the microphone and the data recorded by the peripheral device, and recognize a command with a largest size among the extracted user commands as the user voice.

9. The display device according to claim 1, wherein the controller is configured to extract user commands from each of the data recorded by the microphone and the data recorded by the peripheral device, and recognize user commands that match at least two of the extracted user commands as the user voice.

10. The display device according to claim 1, wherein the controller is configured to compensate the user voice recognition using the audio data received from the peripheral device if a wakeup word is recognized.

11. A display device, comprising:

a speaker;

a wireless communication interface configured to communicate with a peripheral device, wherein the peripheral device comprises a microphone and a speaker;

a microphone configured to record surrounding sounds; and a controller configured to:

synchronize location and delay time with the peripheral device based on audio data, wherein the audio data includes at least one of sound source data being output by the speaker of the display device, data recorded by the microphone of the display device, and audio data received from the microphone of the peripheral device;

obtain pre-processing data from the microphone of the peripheral device for voice recognition based on the synchronized location and delay time; and perform voice recognition on data recorded by the microphone of the display device using the obtained pre-processing data.

12. The display device according to claim 11, wherein the controller is configured to synchronize location and delay time by outputting a sample sound corresponding to an inaudible frequency band if there is no sound source being output by the speaker or synchronization is not performed.

13. The display device according to claim 11, wherein the controller is configured to calculate location of the peripheral device by adjusting a beamforming angle of the microphone.

14. The display device according to claim 11, wherein the controller is further configured to:

if the display device is linked with the peripheral device, obtain preprocessing data based on audio data received from the peripheral device, and recognize a user voice from the data recorded by the microphone using the preprocessing data, and modify the preprocessing data by receiving audio data again from the peripheral device whose movement was detected, if movement of the peripheral device is detected.

15. The display device according to claim 11, wherein the audio data includes at least one of recording data recorded by the peripheral device or sound source data being played by the peripheral device.

16. The display device according to claim 11, wherein the controller is configured to:

if the display device is not linked with the peripheral device, recognize a user voice from the data recorded by the microphone using another preprocessing data.

17. The display device according to claim 11, wherein the controller is configured to detect movement of the peripheral device based on change in a sensing value of an acceleration sensor provided in the peripheral device.

18. The display device according to claim 11, wherein the controller is configured to detect movement of the peripheral device based on detection of a decrease in preprocessing performance.

19. The display device according to claim 11, wherein the peripheral device comprises at least one of a remote control device, a mobile terminal, or a Bluetooth speaker that transmits a control signal to the display device.

* * * * *